Feb. 15, 1955     M. GRUNT     2,702,179
BALL VALVE
Filed March 7, 1950
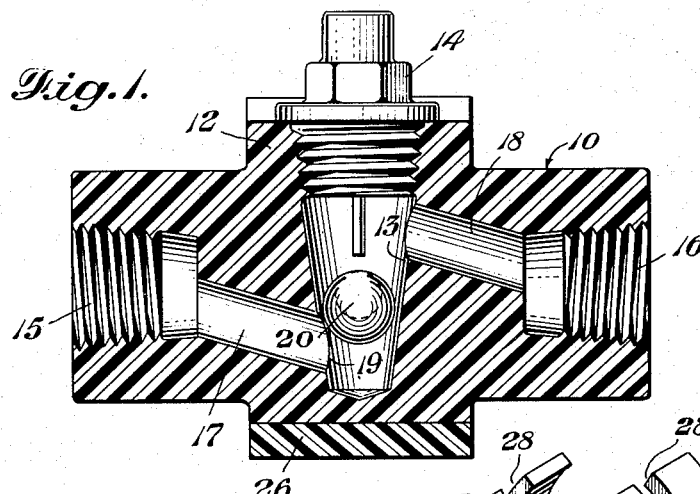
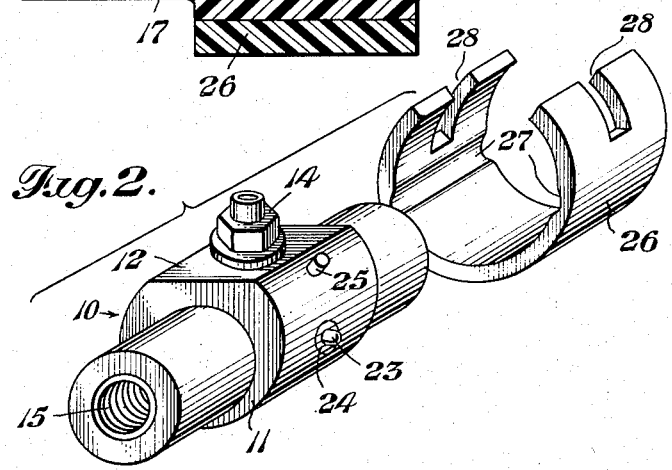
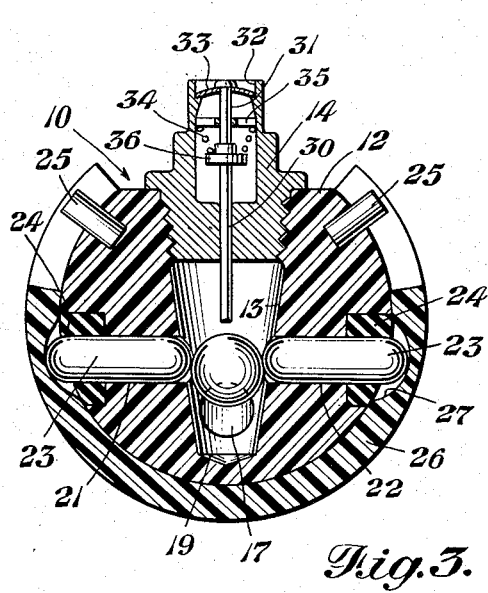
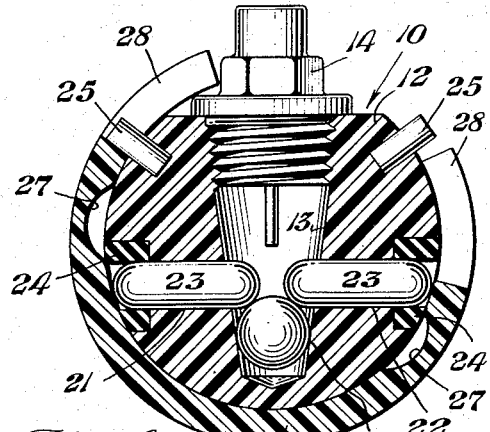
INVENTOR.
*Max Grunt,*
BY
*Flocks and Simon*
ATTORNEYS

2,702,179

BALL VALVE

Max Grunt, Newark, N. J.

Application March 7, 1950, Serial No. 148,244

4 Claims. (Cl. 251—340)

This invention relates to a stop valve and more particularly to an improvement in ball valves used to control the flow of fluid in a line.

This invention has as an object to provide a simple, effective, and easily-manipulated ball valve for a pipe line or the like.

A further object is to provide a valve for controlling the flow of fluids which can be cheaply manufactured from a minimum number of parts and can be readily assembled and inserted into a pipe line.

A still further object of the invention is to provide a ball valve in which the ball is vertically actuated to engage the valve seat in response to rotation of an outer jacket.

Other objects and the nature and advantages of the instant invention will be apparent from the following description taken in conjunction with the accompanying drawings, wherein:

Fig. 1 is a vertical sectional view of the valve in closed position;

Fig. 2 is an exploded perspective view of the valve body and the rotary jacket therefor;

Fig. 3 is a sectional view of the valve in open position, and

Fig. 4 is a similar view to that shown in Fig. 3 showing the valve in closed position.

Referring to the drawings and more particularly to Fig. 1, the reference numeral 10 refers to the valve body which is cylindrical in shape and provided with an offset portion 11 which is of greater diameter than the valve body and eccentric thereto. The top surface 12 of the offset portion 11 is flat. A tapered opening 13 extends downwardly from the center of the top surface 12 to a point near the bottom of the portion 11. The upper end of the opening 13 is threaded to receive a threaded plug 14. A threaded inlet passageway 15 is provided at one end of the valve body, and a threaded outlet passageway 16 is provided at the opposite end of the body in alignment with the inlet passageway. A smaller passageway 17, of approximately one-half the diameter of passageway 15, connects the lower end of the passageway 15 with the lower end of the opening 13. A similar sized passageway 18 connects the upper end of the opening 13 with the upper end of the passageway 16. Thus the path of the fluid through the valve body is through passageway 15, passageway 17, upwardly through opening 13, through passageway 18 and thence through passageway 16 out of the valve body. The surface 19 where the passageway 17 enters the opening 13 acts as a valve seat for a ball 20 when the ball is depressed, thus closing off the flow of fluid. A pair of aligned holes 21 and 22 are provided at right angles to the passageways 17 and 18 at a height intermediate between the heights at which passageways 17 and 18 enter the opening 13. A pair of pins 23 are placed in the holes 21 and 22, each pin having rounded ends. The inner end of the pins 23 are in contact with the upper half of the ball 20, and act as the actuating means for moving the ball downwardly. When the pins 23 are forced inwardly, their inner ends contact the upper portion of the ball 20 and force the ball from the position shown in Fig. 3 to that shown in Fig. 4 to close off the flow. A pair of gaskets 24 are provided surrounding the holes 21 and 22 at their outer ends. The pins 23 each pass through the hole in the gaskets 24 resulting in a fluid tight seal between the valve body 10 and the pins 23. A pair of knobs 25 are attached to the valve body centrally of the offset portion 11 and at the upper end thereof on each side of the flat top surface 12.

A cylindrical hollow jacket 26 adapted to fit around the offset portion 11 of the valve body and of the same width thereof is cut away at the top portion an amount corresponding to the flattened top surface 12 of the valve body. The valve body 10 and the jacket 26 are preferably made of a transparent material such as glass or plastic, although metal can be used if desired. The jacket 26 is provided with a pair of grooves 27 into which the outer ends of the pins 23 are adapted to extend as best shown in Fig. 3. It will be seen that upon rotation of the jacket 26, the grooves 27 will rotate out of alignment with the pins 23 and the pins will be forced inward so that their outer ends rest on the inner diameter of the jacket 26 as illustrated in Fig. 4.

A pair of slots 28 are provided centrally of the jacket at the top thereof at each side opening into the cut away portion. The knobs 25 of the valve body extend through the slots 28 and upon rotation of the jacket 26 one of the knob 25 will engage the end of the slot 28 and act as a stop when the closed position has been reached as shown in Fig. 4. At points intermediate between the two stops, the valve will be in open position. The rotation of the jacket 26 thus results in lateral movement of the pins 23 with the subsequent vertical movement of the ball to a closed position. When the valve is set in opened position, the pressure of the fluid in passageway 17 will force the ball upward, which in turn forces the pins outward into the grooves 27, the inner ends of the pins acting as a stop for the ball 20. The fluid then flows about the ball 20 and out of the passageway 18.

An additional feature of the invention is the incorporation of a safety device in the valve as best illustrated in Fig. 3. A hole 30 is drilled through the plug 14, through which a headed shaft 31 passes. The upper portion of the plug 14 is hollow and is provided with a shoulder 32 in the inner diameter near the top thereof. A fuse 33 which rests on the shoulder 32 is provided with an opening therein through which the shaft 31 passes. The opening is smaller than the head of the shaft, thus acting to support the shaft with the head thereof resting on the fuse. The fuse is preferably made from a relatively low melting metal or alloy. A spring 34 surrounding the shaft 31 is compressed between a projection 35 on the inner diameter of the plug 14 and a flange 36 on the shaft, thus acting to force the shaft 31 downward. In its normal position the lower end of the shaft 31 terminates a short distance above the uppermost position of the ball 20, as shown in Fig. 3. However, if desired, the lower end of the shaft could serve as the stop for the ball when in its uppermost position. When the fuse 33 has melted due to abnormal temperatures in the vicinity due to a fire or the like, the spring acts to force the shaft 31 downward so that the lower end of the shaft engages the ball 20 and the spring pressure forces the shaft and ball downward until the ball engages the valve seat 19 and closes off flow of the fluid. The pressure of the spring must be greater than the pressure of the fluid in the pipe line so as to retain the ball in closed position against the pressure of the fluid.

The construction utilized for actuating the ball valve may be any type of heat responsive device and is not limited to a fuse. Any conventional system as is used in fire alarm systems, including electronic systems, may be utilized.

The valve described herein thus acts as a combination stop valve, fuse valve and check valve, operating in a novel manner and made from relatively few parts. The valve can be readily dismantled for repair and rapidly reassembled and placed in a pipe line.

It will be obvious to those skilled in the art that various changes may be made without departing from the spirit of the invention and therefore the invention is not limited to what is shown in the drawings and described in the specification but only as indicated in the appended claims.

I claim:

1. In a ball valve, a valve body having a chamber formed therein, said valve body having an inlet and an outlet passageway formed therein and communicating with said chamber, a valve seat defined by the intersection of said inlet passageway and said chamber, a ball disposed in said chamber and adapted to engage said valve seat for closing off flow of fluid through said chamber, said ball having a diameter such that when said ball is disposed in the open position in the valve body there is sufficient clearance between the ball and the walls of said chamber to permit flow of fluid through said chamber, a jacket mounted on said valve body and movable relative thereto, said jacket having a pair of oppositely disposed recesses formed on the inner surface thereof, a pair of round-ended pins slidably mounted in said valve body for reciprocatory movement transverse to said valve seat, the inner ends of said pins contacting opposite sides of the upper half of said ball and the outer ends of said pins contacting the jacket and extending into said recesses when said valve is in the open position, said jacket being movable with respect to said valve body to move the outer ends of said pins out of said recesses and force said pins inwardly against said ball thereby moving said ball against said valve seat and shutting off the flow of fluid therethrough.

2. In a ball valve, a valve body having a chamber formed therein, said valve body having an inlet and an outlet passageway formed therein and communicating with said chamber, a valve seat defined by the intersection of said inlet passageway and said chamber, a ball disposed in said chamber and adapted to engage said valve seat for closing off flow of fluid through said chamber, said ball having a diameter such that when said ball is disposed in the open position in the valve body there is sufficient clearance between the ball and the walls of said chamber to permit flow of fluid through said chamber, a jacket mounted on said valve body and movable relative thereto, said jacket having a pair of oppositely disposed recesses formed on the inner surface thereof, a pair of round-ended pins slidably mounted in said valve body for reciprocatory movement transverse to said valve seat, the inner ends of said pins contacting opposite sides of the upper half of said ball, and the outer ends of said pins contacting the jacket and extending into said recesses when said ball valve is in the open position, and a fluid tight seal located in said valve body and surrounding the outer portion of said pins, said seal preventing leakage of fluid from said chamber between said valve body and pins, said jacket being movable with respect to said valve body to move the outer ends of said pins out of said recesses and force said pins inwardly against said ball thereby moving said ball against said valve seat and shutting off the flow of fluid therethrough.

3. In a ball valve, a valve body having a chamber formed therein, said valve body having an inlet and an outlet passageway formed therein and communicating with said chamber, a valve seat defined by the intersection of said inlet passageway and said chamber, a ball disposed in said chamber and adapted to engage said valve seat for closing off flow of fluid through said chamber, said ball having a diameter such that when said ball is disposed in the open position in the valve body there is sufficient clearance between the ball and the walls of said chamber to permit flow of fluid through said chamber, a jacket mounted on said valve body and movable relative thereto, said jacket having a pair of oppositely disposed slots formed therein and a pair of oppositely disposed recesses formed on the inner surface thereof, a pair of round-ended pins slidably mounted in said valve body for reciprocatory movement transversed to said valve seat, the inner ends of said pins contacting opposite sides of the upper half of said ball, and the outer ends of said pins contacting the jacket and extending into said recesses when said ball valve is in the open position, said jacket being movable with respect to said valve body to move the outer ends of said pins out of said recesses and force said pins inwardly against said ball thereby moving said ball against said valve seat and shutting off the flow of fluid therethrough, and stops located on said valve body and operatively disposed in said slots, said stops adapted to be engaged by the end of said slots thereby providing a limit for the rotation of said jacket.

4. In a ball valve, a valve body having a chamber formed therein, a valve seat formed in said chamber, a ball disposed in said chamber and adapted to engage said valve seat for closing off flow of fluid through said chamber, said ball having a diameter such that when said ball is disposed in the open position in the valve body there is sufficient clearance between the ball and the walls of said chamber to permit flow of fluid through said chamber, rotating means mounted on said valve body and movable relative thereto, pins means slidably mounted in said valve body for reciprocatory movement transverse to said valve seat, said pin means contacting said ball and further engaging said rotating means, said rotating means being rotated with respect to said valve body to move said pin means out of engagement therewith and thereby force said pin means inwardly against said ball to move said ball against said valve seat and to shut off the flow of fluid therethrough.

References Cited in the file of this patent

UNITED STATES PATENTS

| Number | Name | Date |
|---|---|---|
| 132,617 | Allen | Oct. 29, 1872 |
| 325,590 | Cosgrove | Sept. 1, 1885 |
| 799,203 | Swinny | Sept. 12, 1905 |
| 847,182 | Jacobsen | Mar. 12, 1907 |
| 875,264 | Hoelder | Dec. 31, 1907 |
| 1,666,283 | Farley | Apr. 17, 1928 |
| 1,891,287 | Niles | Dec. 20, 1932 |
| 2,016,839 | Schoenberger | Oct. 8, 1935 |
| 2,255,774 | Huffman | Sept. 16, 1941 |
| 2,484,940 | Franzheim | Oct. 18, 1949 |

FOREIGN PATENTS

| 23,507 | Great Britain | 1898 |